Patented Oct. 28, 1947

2,429,666

UNITED STATES PATENT OFFICE 2,429,666

AMINO ACID SEPARATION

Richard J. Block, Scarsdale, N. Y., assignor to C. M. Armstrong, Inc., a corporation of New York No Drawing. Application March 21, 1945, Serial No. 584,032

9 Claims. (Cl. 260—309)

This invention relates to treatment of amino acids and particularly to the separation of amino acids from each other.

This application is a continuation in part of the following applications for United States patents filed by me:

Serial No. 466,217, filed November 19, 1942, for Separation of amino acids, issued as Patent 2,386,926 on October 16, 1945; Serial No. 481,787, filed April 3, 1943, for Amino acid separation, issued as Patent 2,387,824 on October 30, 1945; Serial No. 505,243, filed October 6, 1943, for Amino acid separation; and of Serial No. 650,121, filed February 25, 1946, for Amino acid separation. This latter application is a continuation in part of the application Serial No. 505,243, which has now been abandoned.

These previously filed applications describe the separation of monoamino from polyamino acids and of the polyamino acids from each other.

The first separation is effected by passing a protein hydrolysate at an initial pH not substantially above 6.5 slowly over a cation exchange resin preadjusted to a hydrogen cycle, the resin being supported to advantage in a column permitting percolation. The first portion of the effluent that collects is an aqueous solution of the mineral acid used in forming the protein hydrolysate originally. By proper control of the operation, as by switching receivers at a certain pH of the effluent or at the point where test with phosphotungstic acid shows polyamino acids in quantity are just beginning to come through the column, there is then obtained an effluent which is high in monoamino acids but contains very little polyamino acids. As the addition of protein hydrolysate and percolation are continued, there is obtained a third fraction of effluent which contains both monoamino and polyamino acids; the further collection of this fraction of the effluent is stopped, suitably when the pH of the effluent becomes approximately equal to that of the hydrolysate being charged as the influent to the exchange resin. This third fraction is preferably added to fresh protein hydrolysate for separation later.

The above treatment leaves the exchange resin saturated with mixed monoamino acid and polyamino acids. The resin is then washed with water to remove adhering solution. This washing so obtained may be used for dilution of mineral acid to be used in making fresh protein hydrolysate or may be discarded.

In any case the washed column is then treated with a dilute mineral acid, such as hydrochloric acid at a concentration of about 2 to 7% of actual HCl or by ammonia. This treatment liberates the amino acids which are then collected as effluent. This effluent contains polyamino acid in much greater proportion to the monoamino than in the original hydrolysate. Further separations may then be effected.

As recited further in the said copending applications, I have found possible the control of elution by hydrochloric acid or ammonia so as to concentrate certain individual ones of the three essential polyamino acids, histidine, arginine, and lysine, with respect to each other. Thus lysine may be concentrated with respect to the other two. Likewise arginine may be concentrated with respect to the histidine and lysine, that is, to a ratio above that prevailing in the original hydrolysate.

The present invention goes beyond what has been described in the copending applications. It provides a method which greatly increases the capacity of a given weight of the exchange resin or of a column of a given size for effecting separation of amino acids. Also this invention provides for a more effective concentration of either arginine or lysine with respect to the other essential polyamino acids. Finally, it provides in one embodiment a simple method of forming peptides or other complexes from monoamino acids with either arginine or lysine.

The invention comprises contacting mixed monoamino and polyamino acids retained on a cation exchange resin with moderately concentrated to concentrated mineral acid, say at a pH corresponding approximately to that of an aqueous hydrochloric acid solution of at least 13% concentration and preferably 15% to 37%, and withdrawing the solution of the amino acids or their peptides thus liberated from the exchange resin. In a preferred embodiment, the invention comprises liberating amino acids from the resin first with a dilute acid normally used for liberating cations and then with more concentrated acid which liberates a large additional portion of amino acids, in which additional portion arginine is concentrated with respect to other amino acids. In one embodiment, the invention includes the further step of removing the acid from the liquid effluent so obtained as, for instance, by distilling off hydrochloric acid in the form of a constant boiling mixture in suitable form for reuse and thus decreasing the acidity of the elutriated amino product.

As compared with results previously obtained by me, in which the exchange resin retaining monoamino and polyamino acids was contacted with relatively dilute hydrochloric acid or the like, I now liberate from 50 g. dry weight exchange resin in a typical run 1,700 mg. of amino acid nitrogen in round figures as compared to 400 mg. amino acid nitrogen from the same combination of resin and amino acids by the more dilute acid (4% sulfuric acid) previously used. This results in an increase in the capacity of the resin in a given column of about 300% or more.

A further effect which is obtained when the amino acid liberation or elution is effected by the use of the more concentrated mineral acid is the elution of a substantial part of the lysine and arginine present on the exchange resin in the form of a peptide complex, that is, an amino acid condensation product.

The synthesis of peptides from the amino acids heretofore has involved rather complex chemical reactions. In my process there is required for the formation of my complex only the retention of the lysine and arginine in association with monoamino acids on the exchange resin and the subsequent treatment with such concentrated or moderately concentrated strong mineral acid as to release from the resin portions of the amino acids retained so firmly on the resin as not to have been dislodged by the weaker liberating acid previously used.

Once this surprising result has been obtained, various explanations may be advanced to account for it. In the first place, it is obvious from what has been said above that the treatment of the exchange resin, which is approximately saturated with a mixture of monoamino and essential polyamino acids, with the dilute mineral acid heretofore used for the elution liberates not all of the amino acids from the resin but only about a fourth or so of the total. This result is contrary to the understanding that dilute acids liberate and remove substantially all retained cations. The dilute acid treatment I have found to liberate only a small proportion of the adsorbed amino acids. It seems to skim off a superficial layer only. A large part of the effect which I now obtain is due to the liberation by the more concentrated acid of amino acids that are too firmly bonded or held on the exchange resin to be liberated by the superficial skimming by the dilute acid previously considered to liberate all or nearly all the cations.

The strong acid treatment herein described is much more effective than either the dilute weak acid treatment or the ammonia treatment of the saturated exchange resin that has been described in the latest filed of the three copending applications referred to above. Thus, the strong acid treatment is more effective in increasing the capacity of the exchange resin in the separation of the amino acids, in making possible a more effective concentration of arginine or lysine with respect to the other amino acids, and also in the yield of the peptides from the mixture of a monoamino acid and lysine or arginine.

In general the method of operation may be that described in the said copending applications except as specifically stated herein to be otherwise. An exception is the use of the more concentrated acid for the treatment of the exchange resin which is saturated or approximately saturated with the mixture of monoamino and polyamino acids. In other words, when the mineral acid effluent and the following effluent containing amino acids that are mostly the monoamino have been separated and the column washed to improve the separation of the monoamino acids, then the resin remaining in the column and containing both monoamino and polyamino acids, including nearly all of the polyamino acids contacted up to that time with the exchange resin, the mineral acid used at this point for the subsequent elution is the concentrated or moderately concentrated acid.

This acid used is suitably hydrochloric acid. There is no point in using the oxidizing and more expensive hydrobromic acid or nitric acid, the inconvenient hydrofluoric acid, or even sulfuric acid. With the sulfuric acid, for instance, the subsequent recovery of the sulfuric acid for reuse is difficult. Any of these acids may be used, however, when economy of operation is not particularly desired. With hydrochloric acid it is convenient to recover this from the effluent finally obtained, as by distilling off the hydrochloric acid in the form of its constant boiling mixture with water. This mixture has just about the preferred concentration of hydrochloric acid for use in liberating amino acids in a subsequent cycle of the operations described.

When dilute acid is used initially, it is preferably of pH corresponding to about 3% to 7% hydrochloric acid, though concentrations from 1% up to 10% or 11% may be used.

Whether used alone or after a preliminary dilute acid treatment, the concentration of liberating acid used to give the greatly increased proportion of amino compounds from the exchange resin should be relatively high. Thus it should be of pH at least as low as that of 13% hydrochloric acid solution. I obtain the most satisfactory commercial operations when the pH of the acid used corresponds to that of hydrochloric used within range of 15 to 37 parts for 100 of its aqueous solution, all proportions here and elsewhere herein being expressed as parts by weight. Ordinarily I use approximately 20% HCl, this being the constant boiling (azeotropic) mixture of water and hydrochloric acid.

The solution of amino acids which is charged to the exchange resin is suitably made as described in the said copending applications. In an illustrative procedure, blood is hydrolyzed by being warmed with aqueous sulfuric acid solution of concentration about 20%. When the hydrolysis is complete, the cream of lime is added in amount to establish the pH at 9.2 and the ammonia so liberated is removed by boiling or by passing a current of steam through the solution. The precipitate of calcium sulfate is then removed and the remaining solution adjusted to pH 2 to 2.2 with sulfuric acid. After standing overnight, the additional precipitate of calcium sulfate is removed. The calcium sulfate precipitates so separated contain sufficient nitrogenous material so that they may be used as an ingredient of stock feed or fertilizer. The filtrate finally obtained is a protein hydrolysate or solution of amino acids that may be used as the source of the amino acids for separation or peptide formation as described above.

For contacting with the cation exchange resin, the filtrate as used should be acidic, as, for example, at a pH not above 6.5.

The temperature of percolation of the solution of amino acids, such as the blood hydrolysate made as described, over the exchange resin must be below the temperature of objectionable softening of the exchange resin selected and suitably within the range room temperature up to about 50° or 60° C.

The resin selected must contain a sulfonic acid group that is free, that is, includes one ionizable hydrogen. The resin must be solid, insoluble in water and in aqueous mineral acids, and susceptible to subdivision so as to expose a large surface as, for instance, in the form of porous granules. Resins that meet these general requirements and that are satisfactory are the sulfonated phenolformaldehyde resins, say in porous granular form, and particularly the polyhydric sulfonated phenolformaldehyde resins. Such materials are sold under the trade names Amberlite IR-1, Amberlite IR-100, Amberlite XE-17, Duolite C-3, and Ionac C-284.

Various concentrations of the protein hydrolysate may be contacted with the resins of the kind described. While dilution facilitates the subsequent isolation of glutamic acid from the effluent, there is no particular gain, in the steps constituting the present invention, in the use of extremely dilute solutions. Thus, I may use to advantage such concentrations of protein hydrolysate as correspond to 1 to 20 mg. of amino acid nitrogen to the cc. of solution and advantageously about 2 to 6 mg.

The time of contact of the amino acid solution with the exchanger in my method is made longer the higher the concentration of the amino acid solution. Using, for instance, a solution containing 4 mg. of amino acid nitrogen to the cc., I percolate the solution over the exchange resin at the rate of 50 cc. per minute for 100 g. of the resin. Since 100 g. of resin occupy about 300 cc. of volume in a column, this means that the amino acid solution of this concentration is in the column for about 5 or 6 minutes. If the rate of passage through the column is too slow, there is unnecessary loss of time. If, one the other hand, the rate of passage through the column is excessively fast, there is loss of capacity of the resin which retains less than it should from the amino acid solution passing through, up to the end point when the pH of the effluent approximates that of the influent or when polyamino acids begin to appear in quantity in the elutriate. The breaking through of the polyamino acid is shown by test with phophotungstic acid which at that time gives a copious precipitate. This coming through of the polyamino acid shows that the resin in the column is in the condition that may be described as saturated with respect to amino acid.

The invention will be illustrated in greater detail by description in connection with the folfowing examples.

*Example 1*

The cation exchange resin Duolite C-3 in the form of porous granules is filled into a glass column to give a mass of the resin about three feet deep. The resin is adjusted to the acid cycle by treatment with dilute mineral acid in excess, the excess acid withdrawn and the column washed.

Blood protein hydrolysate made as described and at a pH of 6.5 or less is percolated slowly through the bed of resin.

The effluent first through consists essentially of an aqueous solution of the remainder of the mineral acid used in forming the hydrolysate.

When monoamino acids begin to come through, as shown by chemical test or by rise of pH, then the receiver for the effluent is switched and there is collected a second portion of the effluent which is high in proportion of monoamino acids. When polyamino acids begin to show in quantity in the elutriate, as shown by the formation of a heavy precipitate with the phophotungstic acid reagent, the receiver is switched again.

Percolation is continued to advantage until the pH of the effluent approximates that of the blood hydrolysate being charged as influent to the top of the percolator, this portion of the effluent being a mixture of monoamino and polyamino acids that may be set aside for reuse as an addition to a fresh portion of the blood hydrolysate to be treated in a subsequent cycle of operations.

At this stage the resin in the column will have retained a large proportion of a mixture of monoamino and polyamino acids. The condition of the resin may be called saturated although the resin may still have the power to take up substantial amounts of some of the amino acids.

In a mechanical representation of the condition which I have found useful in explaining my results, the resin may be said to bond chemically or otherwise a mixture of monoamino and essential polyamino acids in the form of an inner layer directly on the surface of the resin. Bonded over this inner layer and less firmly held is an outer shell of amino acids. This outer shell is easily dislodged as by dilute hydrochloric acid of concentration up to 7% or other acid solution of equal pH whereas the inner layer of more firmly bonded materials is released only by moderately concentrated to concentrated mineral acid, such as 15 to 37% hydrochloric acid or other acid of at least as low pH.

The elution of the resin saturated with the amino acids is carried out as described below, and to advantage after the saturated resin has been aged by standing for a substantial period of time such as at least 12 hours, and preferably 2 to 10 days or more.

A quantity of constant boiling hydrochloric acid equal in volume to about 4 times the dry weight of the exchange resin is placed in a distilling flask and distilled into a reservoir from whence it is allowed to flow over the column of resin at the same rate as that at which the hydrochloric acid is being distilled off. The acid, after passing through the column, is run back into the distilling flask. This cyclic process is continued until no more polyamino acids are being eluted from the resin as shown by the phosphotungstic acid test. The remainder of the liquid in the column is then drained into the distilling flask. The contents of the flask are then evaporated carefully to dryness, to remove the acid which can be used in a subsequent experiment. The residue consists largely of polyamino acids with a small proportion of monoamino acids. This residue is dissolved in water and the resulting solution decolorized with charcoal. The product after neutralization is a concentrate of polyamino acids including monoamino acids or complexes thereof. It is suitable for incorporation into food products and use in medicine as a source of polyamino acids.

*Example 2*

The procedure of Example 1 is followed up to the stage of saturating the resin with the mixture of amino acids and then washing and draining the column.

The washed and drained resin is then eluted with a constant boiling mixture of approximately 10% hydrochloric acid in 25% aqueous alcohol. The eluting acid mixture here used is not a freshly prepared solution but is a distillate from the spent eluting acid used in the previous example. This solution may contain a substantial proportion of the oxonium salt of ethyl alcohol hydrochloride of the formula

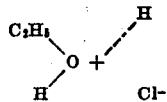

This eluting acid mixture is used as in the above example, until no further quantity of polyamino acids are eluted as shown by a negative phosphotungstic acid test. The column is then drained and the amino acids are separated from the eluting acid by distillation.

In place of the ethyl alcohol of this example, there may be used another lower water soluble alcohol that forms an oxonium salt with the mineral acid, as for example, methyl or isopropyl alcohol. For a given concentration of the mineral acid, the use of the alcohol, say, in the proportion of 20 to 50 parts for 100 of aqueous solution, decreases the extraction of the portion of the amino acids characterized by the firmer bonding to the resin, which portion it is desired to release only with the more concentrated mineral acid in a subsequent treatment.

The resin still contains polyamino acids. These are eluted by using the constant boiling acid mixture described in Example 1.

The actual quantities of polyamino acids eluted by (1) the dilute acid and (2) the concentrated hydrochloric acid acting on the previously dilute-acid-extracted resin in this run were approximately equal. However, the amino acid composition of the two elutriates differ markedly. This is shown in Table I.

*Table I*

| Nitrogen Distribution in Elutriate | Eluting Acid | | |
|---|---|---|---|
| | 10% HCl | 18% HCl | 18% HCl [1] |
| | Per cent | Per cent | Per cent |
| Arginine N/Total N | 15 | 34 | 34 |
| Histidine N/Total N | 22 | 30 | 30 |
| Lysine N/Total N | 26 | (²) | 15 |
| Sum | 63 | 64 | 79 |
| Polyamino N/Total N [3] | 65 | 77 | 77 |

[1] After hydrolysis of elutriated material by boiling with 8-N sulfuric acid for 18 hours.
[2] None by picrate method.
[3] By phosphotungstic acid method.

It will be seen that the concentration of lysine nitrogen in per cent of total nitrogen eluted by the 10% acid is approximately double that eluted by the 18% acid as measured after the hydrolysis. The reverse is true in the case of the arginine. The double extraction results in concentration of the one amino acid with respect to the other. Histidine is eluted to approximately the same extent by both the dilute and concentrated acids.

Furthermore, I have found that such of the arginine, histidine and lysine as appear in the 10% acid elutriate are present as the amino acid salts. Histidine is present in this form in the 18% elutriate also. Both arginine and lysine, however, occur in the 18% elutriate in form other than the amino acid salts. In this form, the lysine does not give the picric acid precipitate which is the usual test for lysine. The flavianate test for arginine gives a mixture of amorphous material and fine needles instead of the flat plate crystals of arginine flavianate. This combination is not split by heating for 1 or 2 hours with 18% hydrochloric acid as is done during the elution or during the separation of the mineral acid from the amino acids by evaporation. The arginine and lysine can only be liberated from this combination by boiling with strong acid such as 8-N sulfuric acid for 18 to 20 hours. After the hydrolysis, the material gives positive tests for lysine and arginine, by the picrate and flavianate tests, respectively.

When so split by boiling with the 8-N sulfuric acid, the amount of the increase in amino acid nitrogen is what would be obtained from a peptide of molecular complexity averaging somewhat greater than the dipeptide and less than tripeptide.

It will be understood also that it is intended to cover all changes and modifications of the example of the invention herein chosen for the purpose of illustration which do not constitute departures from the spirit and scope of the invention.

What I claim is:

1. The method of concentrating lysine, arginine, and histidine with respect to each other which comprises contacting a cationic exchange resin adjusted to the acid cycle and in the form of porous granules with a mixture of the three amino acids until the resin is approximately saturated with the amino acids and then eluting the amino acids from the resin first with dilute mineral acid of pH equal to that of hydrochloric acid of concentration 1 to 11% and then with more concentrated acid of pH at least as acid as that of 13% hydrochloric acid solution, the resin used being insoluble in water and in aqueous mineral acids and including a sulfonic acid group containing an ionizable hydrogen, the first elution giving an increase in the lysine content substantially above the proportion which this amino acid bears to the total amino acids in the original mixture contacted with the resin and the second elution concentrating arginine.

2. The method described in claim 1, the dilute acid used for the first elution having a pH not substantially below that of 7% hydrochloric acid solution.

3. The method of separating amino acids from each other so as to increase the proportion of one with respect to another amino acid which comprises percolating, through porous granules of a sulfonic phenol aldehyde resin that contains an ionizable hydrogen, is insoluble in water and in aqueous mineral acids, and is adjusted to the acid cycle, a solution of a mixture of monoamino and essential polyamino acids containing lysine, arginine and histidine at a pH not above 6.5, continuing the percolation until polyamino acid begins to appear in quantity in the effluent, as determined by the phosphotungstic acid test for polyamino acids, then eluting from the resin the retained monoamino and polyamino acids with an aqueous solution of a mineral acid of strength as an acid equal at least approximately to that of 13% hydrochloric acid solution, this elution with the mineral acid of such concentration releasing from the resin substantial amounts of amino acids that are bonded in such manner as not to be liberated by dilute mineral acid.

4. The method described in claim 3, the eluting acid being an aqueous solution of hydrochloric acid containing at least 18% of actual hydrogen chloride.

5. The method of forming an amino acid complex which comprises contacting a cation exchange resin adjusted to the acid cycle and in the form of porous granules with an acidic solution of monoamino and essential polyamino acids containing lysine, arginine and histidine, continuing the contact and withdrawing that part of the solution which remains unabsorbed until the resin is approximately saturated with amino acids and until a substantial amount of essential polyamino acid remains free in the contacting solution, separating from the resin any solution in contact therewith, and then eluting the thus saturated resin with a mineral acid of pH at least as low as that of an aqueous solution containing 13 parts of hydrogen chloride to 100 parts of water, the resin used being insoluble in water and in aqueous mineral acids and including a sulfonic acid group containing an ionizable hydrogen.

6. The method described in claim 5, the resin used being a polyhydric sulfonic phenolformaldehyde resin and the acid used for the elution being hydrochloric acid of concentration 13 to 37 parts for 100 parts of the aqueous solution.

7. The method of separating amino acids from each other so as to increase the proportion of one with respect to another amino acid which comprises percolating, through a bed of porous granules of a sulfonic phenol aldehyde resin that is insoluble in water and in aqueous mineral acids, contains an ionizable hydrogen, and is adjusted to the acid cycle, a solution of a mixture of monoamino and essential polyamino acids including lysine, arginine, and histidine at a pH not above 6.5, continuing the percolation until polyamino acid begins to appear in quantity in the effluent, as determined by the phosphotungstic acid test for polyamino acids, then eluting from the resin the retained monoamino and polyamino acids with a dilute aqueous alcoholic solution of a mineral acid of pH at least as high as that of 11% hydrochloric acid, and then eluting with mineral acid of pH at least as low as that of 13% hydrochloric acid solution, this elution with the mineral acid of such higher concentration releasing from the resin substantial amounts of amino acids that are bonded in such manner as not to be liberated by the dilute mineral acid.

8. The method of separating amino acids which comprises contacting a cation exchange resin, that is insoluble in water and in aqueous mineral acids, includes a sulfonic acid group containing an ionizable hydrogen, and is in the form of porous granules and adjusted to the acid cycle, with an aqueous solution of the amino acids, lysine, arginine and histidine until the resin is approximately saturated with the said acids, separating from the resin the unabsorbed part of the said solution, eluting the amino acids retained on the resin with an aqueous solution of an oxonium salt of a lower water soluble alcohol with a mineral acid and then eluting the resin and the amino acids retained thereon with an aqueous solution of a mineral acid of pH at least as acid as a hydrochloric acid solution of concentration 13%.

9. The method described in claim 8, the resin with the monoamino and polyamino acids retained thereon being caused to stand for at least 12 hours before effecting the elution with the said aqueous solution of a mineral acid of pH at least as acid as hydrochloric acid solution of concentration 13%.

RICHARD J. BLOCK.

REFERENCES CITED

The following references are of record in the file of this patent:

UNITED STATES PATENTS

| Number | Name | Date |
| --- | --- | --- |
| 2,387,824 | Block | Oct. 30, 1945 |

OTHER REFERENCES

Block, Proc. Soc. Exptl. Biol. and Med. (Nov. 1942), pages 252 to 253.

Englis et al., Ind. and Eng. Chem. (July 1944), pages 604 to 609.